(Model.)
P. RAMMINGER.
FARM GATE.
No. 361,449. Patented Apr. 19, 1887.
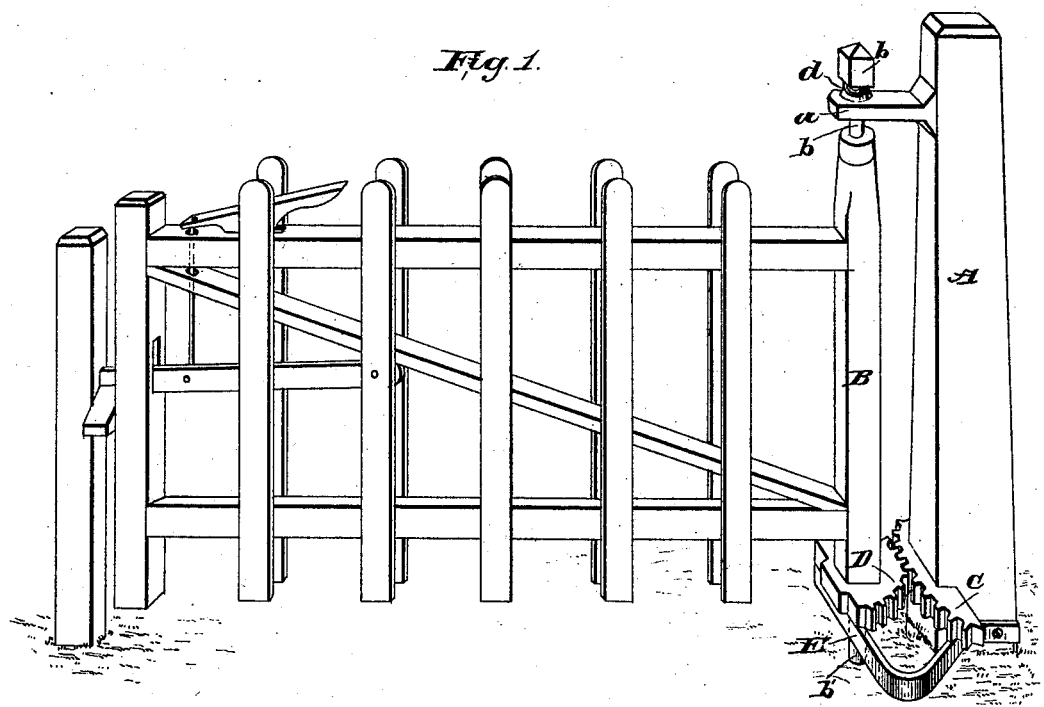
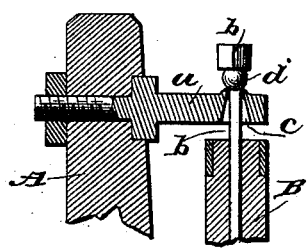
WITNESSES:
Fred J. Dieterich
John C. Kernon
INVENTOR:
P. Ramminger
BY Munn & Co
ATTORNEYS.

UNITED STATES PATENT OFFICE.

PHILIP RAMMINGER, OF GREENWOOD, WISCONSIN.

FARM-GATE.

SPECIFICATION forming part of Letters Patent No. 361,449, dated April 19, 1887.

Application filed March 23, 1886. Serial No. 196,279. (Model.)

*To all whom it may concern:*

Be it known that I, PHILIP RAMMINGER, of Greenwood, in the county of Clark and State of Wisconsin, have invented a new and useful Improvement in Farm-Gates, of which the following is a specification.

My invention is an improvement in the class of horizontally-swinging gates which close automatically by effect of gravity.

The invention is embodied in the construction and combination of parts, as hereinafter described and claimed.

In accompanying drawings, Figure 1 is a perspective view of a gate with my improved form of hinge, and Fig. 2 is a vertical section showing a portion of the gate.

The gate is hinged to a vertical post, A. Its rear vertical bar, B, has pins $b$ $b'$ fixed in its upper and lower ends, respectively. The lower pin, $b'$, works in frictional contact with a curved band, E, attached to post A, for a purpose hereinafter stated, and the upper pin, $b$, serves as a pivot, the same passing through a conical aperture, $c$, in a horizontal bracket, $a$, fixed on the upper end of post B. The pivot-pin $b$ has a spherical or ball-like enlargement, $d$, which rests on the upper side of the bracket $a$, being too large to pass through the aforesaid aperture, and thus serves as the frictional bearing from which the gate is suspended.

Contiguous to the lower end of gate-bar B is attached a horizontal toothed segment D, and directly opposite it a toothed plate, C, is fixed on post A. This segment D and plate C mesh, as shown, and are prevented from being accidentally thrown out of mesh by the aforesaid band E, the latter being curved corresponding to plate C, so that the pin $b'$ in gate-bar B works in frictional contact with the inner side of the same.

It will be seen that when the gate swings either way the plate C, which has a longer radius than segment D, throws the lower end of the bar B farther off from post A; in other words, causes the outer end of the gate to rise gradually, so that when the gate is fully open it stands at a considerable angle to its original horizontal position, and will therefore close automatically by the effect of gravity. It will be further observed that the ball pivot-bearing $d$ reduces friction, so that the gate swings very easily, and the conical form of the aperture in bracket-$a$, allows the pin $b$ to assume the varying angles incident to the to-and-fro movement of the gate.

I disclaim the construction and combination of parts shown in Patent No. 31,852.

What I claim is—

1. The combination, with the gate and post A, of the toothed segment D, and toothed plate C, having a greater radius than the latter, and both meshing together and attached, respectively, to said gate and post, the band E, and pin $b'$, fixed in gate, and the upper pivot-bearing consisting of a bracket, $a$, and the pivot $b$, working in the latter, as shown and described, whereby when the gate is swung in either direction its outer or free end is caused to rise, as shown and described.

2. The combination, substantially as hereinbefore set forth, of the post A, provided near its upper end with a bracket, $a$, having a conical aperture, and near its lower end with band E and toothed plate C, and the gate whose rear bar is provided with a toothed segment meshing with said plate, and with an axial bearing, $b$, having a spherical enlargement, $d$.

PHILIP RAMMINGER.

Witnesses:
R. D. STOKES,
GEO. W. HUBBELL.